Patented May 31, 1949

2,471,575

UNITED STATES PATENT OFFICE 2,471,575

PROCESS OF PREPARING 2,4-DICHLORO-PHENOXYACETIC ACID

Richard H. F. Manske, Guelph, Ontario, Canada, assignor to United States Rubber Company, New York, N. Y., a corporation of New Jersey No Drawing. Application September 4, 1947, Serial No. 772,211. In Canada May 21, 1947

7 Claims. (Cl. 260—521)

This invention relates to a new process for the preparation of 2,4-dichlorophenoxyacetic acid which has recently assumed great commercial importance as a weed-killer and as a plant stimulant.

The principal object of the present invention is to provide a process of making 2,4-dichlorophenoxyacetic acid which gives a maximum yield of good quality material and which may be practiced commercially at low cost. Another object is to provide a process of preparing 2,4-dichlorophenoxyacetic acid by chlorination. It is a further object of our invention to provide such a process in which an exceptionally good yield of 2,4-dichlorophenoxyacetic acid is obtained without the necessity of first preparing 2,4-dichlorophenol. Other objects will more fully hereinafter appear.

2,4-dichlorophenoxyacetic acid is now made by the reaction of 2,4-dichlorophenol, as the alkali metal phenate, with an alkali metal salt of chloroacetic acid. The yields of the required product have not been as high as is desirable and the preliminary preparation of 2,4-dichlorophenol by chlorination of phenol has been troublesome especially because its presence even in very small quantities renders drinking water unpalatable.

Phenoxyacetic acids have been prepared by reacting phenols with sodium or potassium hydroxides to form the phenates and reacting the latter with sodium or potassium salts of chloroacetic acid. This process gives satisfactory yields with phenol but the yields become progressively less satisfactory as the phenol is more and more substituted, particularly with groups ortho to the phenolic hydroxyl. I have observed that phenol gives a better yield of phenoxyacetic acid than 2,4-dichlorophenol gives of 2,4-dichlorophenoxyacetic acid when they are reacted under comparable conditions with sodium hydroxide and chloroacetic acid.

For example, the yield of phenoxyacetic acid from sodium hydroxide, phenol and chloroacetic acid under favorable conditions reached 94%. Under similar conditions which were the most favorable in my experience, the yield of 2,4-dichlorophenoxyacetic acid from 2,4-dichlorophenol, sodium hydroxide and chloroacetic acid was seldom more than 84%. Furthermore the purity of the phenoxyacetic acid was slightly higher than that of the 2,4-dichlorophenoxyacetic acid.

I have now discovered that phenoxyacetic acid can be easily chlorinated to 2,4-dichlorophenoxyacetic acid by carrying out the chlorination at an elevated temperature such that the phenoxyacetic acid and the reaction mixture obtained after the initiation of chlorination are maintained in the molten state. The temperature is always above the melting point of phenoxyacetic acid which melts at 99° C. After chlorination has been initiated, it is usually necessary to elevate the temperature because of the formation of chlorinated phenoxyacetic acids which melt at a substantially higher temperature. Thus, 2,4-dichlorophenoxyacetic acid is reported to have a melting point of 140–141° C. While 4-chlorophenoxyacetic acid is reported to melt at 159–160° C. However the melting point of the reaction mixture drops rapidly during the chlorination because of eutectic type lowerings of the melting point. It rises again at the end of chlorination when 2,4-dichlorophenoxyacetic acid is present in the greatest quantity. Ordinarily I gradually increase the temperature during the chlorination. For example I may initiate the chlorination at a temperature of 100° C. and gradually increase the temperature during the chlorination until at the end of chlorination the molten material is at a temperature of 150° C.

The chlorination may be conducted simply by bubbling chlorine gas through the molten phenoxyacetic acid until the reaction mixture comprises mainly 2,4-dichlorophenoxyacetic acid which may be determined by the fact that two atoms of chlorine have been introduced per molecule of phenoxyacetic acid originally taken. The reaction is slightly exothermic and if desired provision may be made to retain the liberated heat and thereby effect the desired elevation of temperature and maintain the mixture molten at all times. Extraneous heat may be applied if necessary to accomplish the required maintenance of the molten condition at all times.

The molten mixture may be agitated mechanically during the introduction of the chlorine in order to promote intimate admixture of the chlorine with all parts of the reaction mixture. The temperature is raised sufficiently to counteract the normal tendency of the 4-chlorophenoxyacetic acid to crystallize from the reaction mixture. In some cases the agitation effected as a result of the bubbling of the chlorine gas into the molten reaction mixture may be sufficient.

If desired the gas above the molten reaction mixture may be vented from the system as the chlorination is effected. In this way hydrogen chloride which is formed by the chlorination reaction may to some extent be removed from the system. If desired an inert gas may be mixed with the chlorine gas introduced into the molten mixture and the gas over the molten mixture vented from the system. In this way removal of the hydrogen chloride may be expedited.

After the chlorination is completed, i. e. when two atoms of chlorine have been caused to react with each molecule of phenoxyacetic acid so that the product consists chiefly of the desired 2,4-dichlorophenoxyacetic acid, the dissolved chlorine and hydrogen chloride may be removed from the molten reaction product by stripping with a stream of inert gas such as nitrogen, air, etc. The liquid melt may then be allowed to cool and solidify. The product may be used directly as a weed-killer or it may be recrystallized from a suitable solvent such as benzene where a completely pure product is desired.

No solvent is necessary in the chlorination step since the temperature is such that the reaction mixture remains liquid without the use of a solvent. Those skilled in the art will readily appreciate the advantages of being able to operate in the absence of a solvent and its attendant complications.

Surprisingly enough there is no appreciable decomposition at the high temperatures used in practicing the present invention and when the weight increase indicates that two chlorine atoms have entered the molecule the reaction product is essentially the desired 2,4-dichlorophenoxyacetic acid and contains very little trichlorophenoxyacetic acid and very little or no mono-chlorophenoxyacetic acid. Substantially all of the chlorine which reacts does so by substitution in the 2- and the 4-positions on the benzene ring and other reactions do not take place to more than a negligible extend. The advantages of avoiding the occurrence of other reactions such as substitution of chlorine in the acetic acid residue or substitution of chlorine on the ring to give other products than the 2,4-dichlorophenoxyacetic acid will be obvious to those skilled in the art.

The product of the process of my invention is virtually free of chlorinated phenols. This indicates that there is very little reaction between the substitutively chlorinated phenoxyacetic acid and hydrogen chloride liberating chlorinated phenol.

If desired, a halogen carrier catalyst may be present during the chlorination. Such a catalyst may be intimately and homogeneously dispersed throughout or dissolved in the molten phenoxyacetic acid prior to the beginning of introduction of chlorine. Examples of suitable materials for this purpose are: iodine, bromine, antimony pentachloride, etc. There are a very large number of halogen carriers which may be used to catalyze chlorinations. These are well known to those versed in the art and need not be named specifically since any of them may be used in carrying out the chlorination of the present invention and since the use of such catalysts constitutes per se no part of my invention. The catalyst may be soluble or insoluble in the reaction mixture.

Following is a non-limiting illustrative example of the practice of my invention.

*Example*

Phenoxyacetic acid having a melting point of 99° C. was employed. 304 parts by weight of this material were heated to about 110° C. in a vessel which itself was resistant to the corrosive action of chlorine and hydrogen chloride. A stream of chlorine was introduced into the molten phenoxyacetic acid. As chlorination proceeded the 4-chlorophenoxyacetic acid which was formed tended to crystallize from the reaction mixture. The temperature was gradually raised to maintain the latter in solution so that by the time 2 atoms of chlorine had been introduced for every molecule of phenoxyacetic acid originally present the temperature was approximately 150° C.

The dissolved chlorine and hydrogen chloride were then removed by a stream of air and the liquid product was withdrawn and allowed to solidify by cooling to a pale yellow crystalline mass. The yield of crude 2,4-dichlorophenoxyacetic acid thus obtained was 442 parts by weight, that is 100%. It melted indefinitely at around 130°. It was virtually free of chlorinated phenols. When it was recrystallized from benzene it melted at 137–138° C. and the yield of once recrystallized product was about 375 parts by weight or 85% of theory. If desired, the 15% of impure 2,4-dichlorophenoxyacetic acid remaining in the mother liquor from the benzene recrystallization can be worked up to give more pure 2,4-dichlorophenoxyacetic acid.

From the foregoing description it will be seen that the present invention provides a simple and highly advantageous method of making 2,4-dichlorophenoxyacetic acid. It will be seen that higher yields of the desired product, 2,4-dichlorophenoxyacetic acid, are obtained by first combining the phenol and the chloroacetic acid to give phenoxyacetic acid and then chlorinating this in accordance with my invention than are obtained by chlorinating the phenol to 2,4-dichlorophenol and then condensing this with chloroacetic acid in accordance with conventional practice.

In one aspect, the present invention is a process of synthesizing 2,4-dichlorophenoxyacetic acid from phenol and chloroacetic acid which comprises reacting phenol with chloroacetic acid in the presence of an alkali metal hydroxide to give the alkali metal salt of phenoxyacetic acid, recovering phenoxyacetic acid from the reaction mixture by acidification followed by separation of the precipitated phenoxyacetic acid, and directly chlorinating this phenoxyacetic acid by heating same to the melting point and passing chlorine therethrough while maintaining the reaction mixture in molten state and continuing in this manner until substantially two atoms of chlorine per molecule of phenoxyacetic acid have entered into the phenoxyacetic acid by substitution substantially only in the 2- and 4-positions. Thus my invention provides a new and improved route for the synthesis of the valuable chemical, 2,4-dichlorophenoxyacetic acid, from the raw materials which have heretofore been employed.

Having thus described my invention, what I claim and desire to protect by Letters Patent is:

1. A process of preparing 2,4-dichlorophenoxyacetic acid which comprises introducing elemental chlorine into phenoxyacetic acid while maintaining the phenoxyacetic acid and the resulting reaction mixture in the molten state and in the absence of a solvent until substantially two atoms of chlorine per molecule of phenoxyacetic acid originally present have entered into the phenoxyacetic acid molecule by substitution.

2. A process of preparing 2,4-dichlorophenoxyacetic acid which comprises introducing chlorine gas into phenoxyactic acid while maintaining the phenoxyacetic acid and the resulting reaction mixture in the molten state and in the absence of a solvent and continuing said introduction of chlorine gas until substantially 2 atoms of chlorine for every molecule of phenoxyacetic acid originally present have entered the phenoxyacetic acid molecule by substitution.

3. A process of preparing 2,4-dichlorophenoxyacetic acid which comprises introducing chlorine gas into phenoxyacetic acid while maintaining the phenoxyacetic acid and the resulting reaction mixture in the molten state in the absence of a solvent, and at a temperature ranging between the melting point of phenoxyacetic acid and that of 4-chlorophenoxyacetic acid and continuing said introduction of chlorine gas until substantially two atoms of chlorine per molecule of phenoxyacetic acid originally present have entered the phenoxyacetic acid molecule by substitution.

4. A process of preparing 2,4-dichlorophenoxyacetic acid which comprises introducing chlorine gas into phenoxyacetic acid in the absence of a solvent and at a temperature above the melting point of phenoxyacetic acid, gradually increasing the temperature during said introduction of chlorine gas so that the reaction mixture is molten throughout said introduction, continuing the introduction of chlorine gas and the elevation of the temperature until substantially two atoms of chlorine per molecule of phenoxyacetic acid originally present have entered the phenoxyacetic acid molecule by substitution and the reaction mixture comprises mainly 2,4-dichlorophenoxyacetic acid and is at a temperature above the melting point of 2,4-dichlorophenoxyacetic acid.

5. A process of preparing 2,4-dichlorophenoxyacetic acid which comprises introducing chlorine gas into phenoxyacetic acid in the absence of a solvent and at a temperature above the melting point of phenoxyacetic acid, mechanically stirring the reaction mixture during said introduction of chlorine gas and gradually increasing the temperature during said introduction so that the reaction mixture is molten throughout said introduction and so that 4-chlorophenoxyacetic acid formed is maintained in solution in the molten reaction mixture, and continuing the introduction of chlorine gas and the elevation of the temperature until substantially two chlorine atoms per molecule of phenoxyacetic acid originally present have entered into the phenoxyacetic acid molecule by substitution and until the temperature is above the melting point of 2,4-dichlorophenoxyacetic acid but is not above 150° C.

6. A process of preparing 2,4-dichlorophenoxyacetic acid which comprises introducing chlorine gas into a body of molten phenoxyacetic acid, maintaining the reaction mixture molten throughout the introduction of chlorine, carrying out said introduction in the absence of a solvent, continuing said introduction until two atoms of chlorine per molecule of phenoxyacetic acid have entered the phenoxyacetic acid molecule by substitution and the reaction product consists essentially of 2,4-dichlorophenoxyacetic acid, and then discontinuing said introduction of chlorine and removing dissolved chlorine and hydrogen chloride from the reaction mixture.

7. The process of claim 6 wherein the temperature of the molten phenoxyacetic acid at the initiation of the chlorination is 100° C. and wherein the temperature of the reaction mixture is gradually raised during the chlorination until at the end of chlorination it is 150° C.

RICHARD H. F. MANSKE.

REFERENCES CITED

The following references are of record in the file of this patent:

UNITED STATES PATENTS

| Number | Name | Date |
| --- | --- | --- |
| 1,867,766 | Schindhelm | July 19, 1932 |

FOREIGN PATENTS

| Number | Country | Date |
| --- | --- | --- |
| 17,147 | Great Britain | 1892 |

OTHER REFERENCES

Peratoner, "Gazz. Chim. Italia," vol. 28 (1898), pp. 238–239.

Jones, "J. Chem. Soc." (London)—(1935), pp. 1831–1840.

Jones, "J. Chem. Soc." (London)—(1942), pp. 418–420.

Haskelberg, "Journ. Org. Chem.," vol. 12, pp. 426–433, (1947).